US006878896B2

(12) United States Patent
Braginsky et al.

(10) Patent No.: US 6,878,896 B2
(45) Date of Patent: Apr. 12, 2005

(54) SYNCHRONOUS SEMI-AUTOMATIC PARALLEL SORTING

(75) Inventors: Mark B. Braginsky, Longmeadow, MA (US); Peter R. Gluege, Westport, CT (US); Robert H. Esslinger, Wilton, CT (US); William D. Hess, Clinton Corners, NY (US)

(73) Assignee: United Parcel Service of America, Inc., Atlanta, GA (US)

( * ) Notice: Subject to any disclaimer, the term of this patent is extended or adjusted under 35 U.S.C. 154(b) by 75 days.

(21) Appl. No.: 10/205,016

(22) Filed: Jul. 24, 2002

(65) Prior Publication Data

US 2004/0016684 A1 Jan. 29, 2004

(51) Int. Cl.[7] .................................................. G06K 9/00

(52) U.S. Cl. ........................ 209/583; 209/546; 209/705; 700/213; 700/214; 700/215; 700/225; 700/226

(58) Field of Search ................................ 209/546, 549, 209/583, 584, 705, 900; 700/213–215, 219, 221, 223–226

(56) References Cited

U.S. PATENT DOCUMENTS

| | | | |
|---|---|---|---|
| 3,576,368 | A | 4/1971 | Goetz |
| 3,783,295 | A | 1/1974 | Casler |
| 3,802,548 | A | 4/1974 | Wentz et al. |
| 4,268,165 | A | 5/1981 | Bradmon |
| 4,348,097 | A | 9/1982 | Sippel |
| 4,498,744 | A | 2/1985 | Ealovega et al. |
| 4,515,455 | A | 5/1985 | Northmore |
| 4,544,064 | A | 10/1985 | Felder |
| 4,597,495 | A | 7/1986 | Knosby |
| 4,615,446 | A | 10/1986 | Pavie |
| 4,711,357 | A | 12/1987 | Langenbeck et al. |
| 4,736,109 | A | 4/1988 | Dvorzsak |
| 4,760,247 | A | 7/1988 | Keane et al. |
| 4,776,464 | A | 10/1988 | Miller et al. |
| 4,788,596 | A | 11/1988 | Kawakami et al. |

(Continued)

FOREIGN PATENT DOCUMENTS

| | | | | |
|---|---|---|---|---|
| EP | 489176 A1 * | 6/1992 | | ............ B65G/1/00 |
| EP | 05-144147 | 9/1993 | | |
| EP | 1 128 315 A1 | 8/2001 | | |
| FR | 2676941 A1 | 12/1992 | | |
| JP | 56-4870 | 1/1981 | | |
| WO | WO 98/32545 | 7/1998 | | |
| WO | PCT/US00/09250 | 10/2000 | | |

OTHER PUBLICATIONS

International Search Report from corresponding International Application No. PCT/US03/22922 dated Jul. 23, 2003.

(Continued)

*Primary Examiner*—Donald P. Walsh
*Assistant Examiner*—Matthew J. Kohner
(74) *Attorney, Agent, or Firm*—Alston & Bird LLP

(57) ABSTRACT

The present invention reveals a sorting system for use in manual sorting, which presents a detached ephemeral display moving in a manner corresponding to the movement of the article, by which an article to be sorted can be quickly and easily identified. To accomplish its purpose, the device comprises: feed conveyors; a switching unit; optical readers positioned to capture destination indicia affixed to each article; a detached moving display which remains close to the article to be sorted and presents information representative of the article's destination location; a destination location which signals when a related article is approaching; and a controller capable of assigning destination locations and controlling display devices.

35 Claims, 7 Drawing Sheets

U.S. PATENT DOCUMENTS

| | | | | | |
|---|---|---|---|---|---|
| 4,805,778 | A | | 2/1989 | Nambu | |
| 4,832,204 | A | | 5/1989 | Handy et al. | |
| 4,874,936 | A | | 10/1989 | Chandler et al. | |
| 4,877,949 | A | | 10/1989 | Danielson et al. | |
| 4,896,029 | A | | 1/1990 | Chandler et al. | |
| 4,992,649 | A | | 2/1991 | Mape et al. | |
| 5,095,204 | A | | 3/1992 | Novini | |
| 5,101,983 | A | | 4/1992 | Scata | |
| 5,115,121 | A | | 5/1992 | Bianco et al. | |
| 5,128,528 | A | | 7/1992 | Heminger | |
| 5,140,141 | A | | 8/1992 | Inagaki et al. | |
| 5,141,097 | A | | 8/1992 | Oiry et al. | |
| 5,165,520 | A | | 11/1992 | Herve et al. | |
| 5,185,822 | A | | 2/1993 | Miura | |
| 5,190,162 | A | | 3/1993 | Hartlepp | |
| 5,245,172 | A | | 9/1993 | Esslinger et al. | |
| 5,308,960 | A | | 5/1994 | Smith et al. | |
| 5,309,190 | A | | 5/1994 | Shinohara et al. | |
| 5,311,999 | A | | 5/1994 | Malow et al. | |
| 5,323,327 | A | | 6/1994 | Carmichael et al. | |
| 5,327,171 | A | | 7/1994 | Smith et al. | |
| 5,353,091 | A | | 10/1994 | Ishida et al. | |
| 5,431,288 | A | | 7/1995 | Nishijima et al. | |
| 5,463,432 | A | | 10/1995 | Kahn | |
| 5,481,096 | A | | 1/1996 | Hippenmeyer et al. | |
| 5,481,298 | A | | 1/1996 | Sasaki et al. | |
| 5,485,263 | A | | 1/1996 | Bjorner et al. | |
| 5,506,912 | A | | 4/1996 | Nagasaki et al. | |
| 5,510,603 | A | | 4/1996 | Hess et al. | |
| 5,515,447 | A | | 5/1996 | Zheng et al. | |
| 5,566,245 | A | | 10/1996 | Zheng et al. | |
| 5,567,927 | A | | 10/1996 | Kahn et al. | |
| 5,607,187 | A | | 3/1997 | Salive et al. | |
| 5,620,102 | A | | 4/1997 | Finch, Jr. | |
| 5,642,442 | A | | 6/1997 | Morton et al. | |
| 5,646,616 | A | * | 7/1997 | Komatsu | 340/988 |
| 5,667,078 | A | | 9/1997 | Walach | |
| 5,677,834 | A | | 10/1997 | Mooneyham | |
| 5,687,850 | A | | 11/1997 | Speckhart et al. | |
| 5,695,071 | A | | 12/1997 | Ross et al. | |
| 5,697,504 | A | | 12/1997 | Hiramatsu et al. | |
| 5,712,789 | A | * | 1/1998 | Radican | 700/226 |
| 5,720,157 | A | * | 2/1998 | Ross | 700/223 |
| 5,725,253 | A | | 3/1998 | Salive et al. | |
| 5,770,841 | A | | 6/1998 | Moed et al. | |
| 5,781,443 | A | * | 7/1998 | Street et al. | 700/214 |
| 5,794,789 | A | * | 8/1998 | Payson et al. | 209/549 |
| 5,857,029 | A | | 1/1999 | Patel | |
| 5,881,890 | A | * | 3/1999 | Wiley | 209/703 |
| 5,900,611 | A | | 5/1999 | Hecht | |
| 5,920,056 | A | | 7/1999 | Bonnet | |
| 5,923,017 | A | | 7/1999 | Bjorner et al. | |
| 5,943,476 | A | | 8/1999 | Dougherty et al. | |
| 5,971,587 | A | * | 10/1999 | Kato et al. | 700/115 |
| 6,060,992 | A | | 5/2000 | Huang et al. | |
| 6,061,644 | A | | 5/2000 | Leis | |
| 6,064,476 | A | | 5/2000 | Goltsos | |
| 6,076,683 | A | * | 6/2000 | Okada et al. | 209/656 |
| 6,094,509 | A | | 7/2000 | Zheng et al. | |
| 6,122,410 | A | | 9/2000 | Zheng et al. | |
| 6,148,249 | A | | 11/2000 | Newman | |
| 6,185,479 | B1 | * | 2/2001 | Cirrone | 700/216 |
| 6,189,784 | B1 | | 2/2001 | Williams et al. | |
| 6,236,735 | B1 | | 5/2001 | Bjorner et al. | |
| 6,243,620 | B1 | | 6/2001 | Robinson et al. | |
| 6,259,964 | B1 | * | 7/2001 | Robinson | 700/224 |
| 6,282,462 | B1 | | 8/2001 | Hopkins | |
| 6,285,916 | B1 | * | 9/2001 | Kadaba et al. | 700/222 |
| 6,332,098 | B2 | * | 12/2001 | Ross et al. | 700/226 |
| 6,352,349 | B1 | | 3/2002 | Braginsky et al. | |
| 6,370,446 | B1 | * | 4/2002 | Divine | 700/226 |
| 6,437,272 | B2 | * | 8/2002 | Tamamoto et al. | 209/584 |
| 6,600,418 | B2 | * | 7/2003 | Francis et al. | 340/572.1 |
| 6,610,954 | B2 | * | 8/2003 | Takizawa | 209/583 |
| 6,651,820 | B2 | * | 11/2003 | Takizawa | 209/546 |
| 6,665,422 | B1 | * | 12/2003 | Seidel et al. | 382/101 |
| 6,665,585 | B2 | * | 12/2003 | Kawase | 700/226 |
| 6,680,452 | B2 | * | 1/2004 | Takizawa | 209/583 |
| 6,685,031 | B2 | * | 2/2004 | Takizawa | 209/546 |
| 6,729,544 | B2 | * | 5/2004 | Navon | 235/462.14 |
| 2001/0032805 | A1 | | 10/2001 | Lawandy et al. | |
| 2002/0032805 | A1 | | 3/2002 | Parry | |
| 2002/0036160 | A1 | * | 3/2002 | Reed | 209/546 |
| 2002/0065577 | A1 | * | 5/2002 | Teraura et al. | 700/226 |
| 2002/0080031 | A1 | * | 6/2002 | Mann et al. | 340/572.1 |
| 2003/0009254 | A1 | * | 1/2003 | Carlson et al. | 700/115 |
| 2003/0106771 | A1 | | 6/2003 | Takizawa | |
| 2003/0116480 | A1 | * | 6/2003 | Takizawa | 209/583 |
| 2003/0116481 | A1 | * | 6/2003 | Takizawa | 209/583 |
| 2003/0139847 | A1 | * | 7/2003 | Tsai | 700/226 |
| 2003/0141226 | A1 | * | 7/2003 | Morikawa | 209/584 |
| 2003/0191557 | A1 | * | 10/2003 | Takehara et al. | 700/225 |
| 2003/0201212 | A1 | * | 10/2003 | Reed | 209/702 |
| 2003/0212467 | A1 | * | 11/2003 | Ogihara et al. | 700/115 |
| 2003/0233165 | A1 | * | 12/2003 | Hein et al. | 700/216 |

OTHER PUBLICATIONS

Verbex Voice Systems, Inc., Press Release: Verbex's New Portable Speech Recognizer Enables Fast And Accurate Data Entry For Factory Floors ANd Warehouses, May 11, 1993, five pages.

Verbex Paper, Verbex Speech Commander Portable . . . Continuous Speech Recognizer For Mobile Computing, two pages.

Citation, 202 F.3d 1340; 53 U.S.P.Q.2d 1580, United States Court of Appeals, *Winner International Royalty Corporation* vs. *Ching–Rong Wang*, Defendant; No. 98–1553; Jan. 27, 2000, copy of case; 18 pages.

IBM Corp, "Parcel Positioning Scanning And Sorting System," IBM Technical Disclosure Bulletin, vol. 15, No. 4, Sep. 1972, pp. 1170–1171, XP002065579 US.

Yamada Yasuo, Inventor; Nippondenso Co. Ltd, Applicant; "Optical Information Reader [Abstract Only]," Patent Abstracts of Japan, Publication Date Aug. 9, 1996, Publication No. 0820 2806 (Abstracts published by the European Patent Office on Dec. 26, 1996, vol. 1996, No. 12).

* cited by examiner

SYNCHRONOUS SEMI-AUTOMATIC PARALLEL SORTING

TECHNICAL FIELD

The present invention relates to the semi-automatic sorting of articles, and more particularly relates to a detached display, that is, an illuminated and dynamically moving electronic ticker-tape which transmits a readily visible signal representative of the destination location of an article to be manually sorted. The signal is in human readable form and remains substantially close to the article to be sorted as the article is conveyed toward a manual sorting operator positioned near a plurality of destination locations.

BACKGROUND ART

Daily, package delivery companies collect millions of packages from thousands of locations scattered over large geographical areas and transport them to sorting facilities for processing. Initially, laborers employed at a sorting facility performed the sorting process, that is, they had to grab, lift, carry and place the packages from one sorting station to another. Presently, extensive use of manual labor has diminished as new sorting facilities are equipped with automated sorting and transfer systems.

However, for various reasons, it may not be practicable or desirable to entirely replace the manual sorting process. Furthermore, it may even be desirable to integrate manual and automated sorting systems to create a semi-automatic sorting process. For example, it is known to mechanically pre-sort objects transported toward a manual sorter; to mechanically divert objects from a feed conveyor into adjacent receiving containers for future manual sorting; and to have a manual sorter scan a machine readable label affixed to a package before the manual sorting process can continue.

U.S. Pat. No. 5,697,504 (Hiramatsu et al.) describes a video coding system which reads and converts alpha-numeric symbols, such as the address and zip code of a mailing, into a bar code which is then printed and affixed to the article. Thereafter, the bar code is scanned and the mailing is automatically sorted under programmed control according to the destination location represented by the bar code. In the event the alpha-numeric symbols are not decipherable by the video coder, a terminal displays the mailing's addressee to an operator who then deciphers the address to the extent necessary to generate the bar code.

The article handling and routing system described in U.S. Pat. No. 4,776,464 (Miller et al.) includes an automated method and system for optically detecting destination data on a tag affixed to a piece of luggage. There, the tag bears a uniquely configured target symbol positioned adjacent to data representative of the luggage's intended destination. Cameras, positioned upstream of a diverter, capture the target symbol and other pertinent information on the tag as it passes within the camera's field of view. The destination data is then processed and used to direct a diverter under programmed control.

French Patent 2,676,941 (Roch) describes an automatic envelope sorting system which includes a feed conveyor, switching devices, and a series of compartments arranged in rows and columns. These compartments contain modules designed to accept envelopes, sorted according to final destination, until the module is full. Thereafter, the compartment is automatically emptied by a mechanism which replaces the full module with an empty one.

The sorting machine disclosed in U.S. Pat. No. 4,615,446 (Pavie) describes an automated sorting system wherein envelopes are transported along parallel feed conveyors toward switching units which read a destination marker affixed to each envelope. Based on the destination marker information, the switching unit either allows the envelope to continue uninterrupted toward a downstream sorting line or directs the envelope to an adjacent parallel conveyor which will transport the envelope toward another downstream sorting line.

Verbex Voice Systems, Inc. (Edison, N.J.), manufactures and distributes a portable continuous speech recognizer, Speech Commander™ Portable, available with a headset and digitized speech response which communicates with a remote computer. An operator engaged in manual sorting and wearing Speech Commander™ may speak an article's destination location into the headset, which the computer receives and processes. The computer then responds to the operator with a verbal prompt through the headset, which identifies the receiver or bin associated with that article's destination location.

The prior art automated sorting devices rely upon machine readable codes and symbols. The code or symbol affixed to an object is decoded and the resulting signal is used to automatically sort and transfer the object under programmed control. Should the automated sorting process fail to correctly transfer an object, that object must be manually sorted. Currently, manual sorting within or after an automated process requires an operator to decode the machine readable label on each article to be sorted before continuing the sorting process.

Thus, there is a need in the art for a system that improves manual sorting by eliminating repetitive steps such as hand-scanning, marking and labeling each article to be sorted; provides a means by which a manual operator can quickly and easily identify an article to be sorted; decreases sorting errors which arise from misread labels; and, increases the throughput efficiency of manual sorters.

SUMMARY OF THE INVENTION

The present invention seeks to assist the manual sorting operator by eliminating redundant manual procedures such as hand-scanning, marking, or labeling an article before it can be sorted. The present invention also seeks to assist the manual sorting operator by providing a detached ephemeral signal, which moves in a manner corresponding to the movement of the article, by which an article to be sorted can be quickly and easily identified. Finally, the present invention seeks to assist the manual sorting operator increase throughput speed and reduce mis-sort errors.

In accordance with the present invention, these objectives are accomplished by providing a device which comprises a conveyor positioned to transport articles to a sorting operator, and a detached indicator moving in a manner corresponding to the movement of the article to be sorted, which relates the article to an associated destination location.

The present invention, in one of its embodiments, also seeks to cure the process problems and prior art inadequacies noted above by providing a detached textual display which identifies, in human readable form, an article to be sorted and its related destination location. The display remains substantially close to the related article as that article is conveyed toward a manual sorting operator positioned near a plurality of destination locations.

Here, an indicator is a signal presented in human perceptible form which identifies an article to be sorted and relates the article to a destination location. Here, a display is a signal presenting textual information in visually perceptible form which identifies an article to be sorted and a related destination location. Whether an indicator or display, the signal is ephemeral; moving in a manner corresponding to the movement of the article and may be matched with a related destination location signal as part of the manual sorting process. For the purpose of this disclosure, any form of the verb "transmit" is perfectly synonymous with any form of the verb "present" when referencing a signal which is either sent by a device or received by the sorting operator.

In the preferred embodiment, two parallel feed conveyors are positioned to transport articles to be sorted toward a switching unit. The switching unit is configured to transfer the articles between the parallel conveyors and discharge them in ordered sequenced onto sorting conveyors. The sorting conveyors transport the articles toward sorting operators. The detached display, an LED panel, is positioned adjacent to the sorting conveyors and is configured to present dynamically moving alpha-numeric characters, much like an electronic ticker-tape. The LED panel presents information representative of the article and related destination location under programmed control, such that the information visually moves in a manner corresponding to the movement of the article. The destination location, positioned adjacent the sorting conveyor and sorting operator, is configured to transmit a perceptible signal when an associated article is approaching. The sorting operator, upon observing the information presented on the display and the signal transmitted from the related destination location, removes the article from the sorting conveyor and places it within the destination location.

In practice, the switching unit, detached indicator, and destination location signal are directed according to destination indicia affixed to the article and input to a programmed logic controller by an optical reader. The controller assigns a destination location for each article and generates a destination signal, later converted and presented in human readable form for the sorting operator. Shaft encoders on each of the conveyors track the position of the articles while photocell sensors immediately before the optical readers and switching unit activate those devices and associate the results with particular articles.

Alternative embodiments incorporating the present invention are readily apparent. For example, a beam of light cast onto a moving article may replace the display, and a stationary display may identify the related destination location. In addition, audible signals may replace the visual signals. Also, because of the flexibility of the detached indicator, the structure of the preferred sorting configuration may be reduced or expanded in response to the number of destination locations or fluctuations in operating volume.

DETAILED DESCRIPTION

Figure 1:
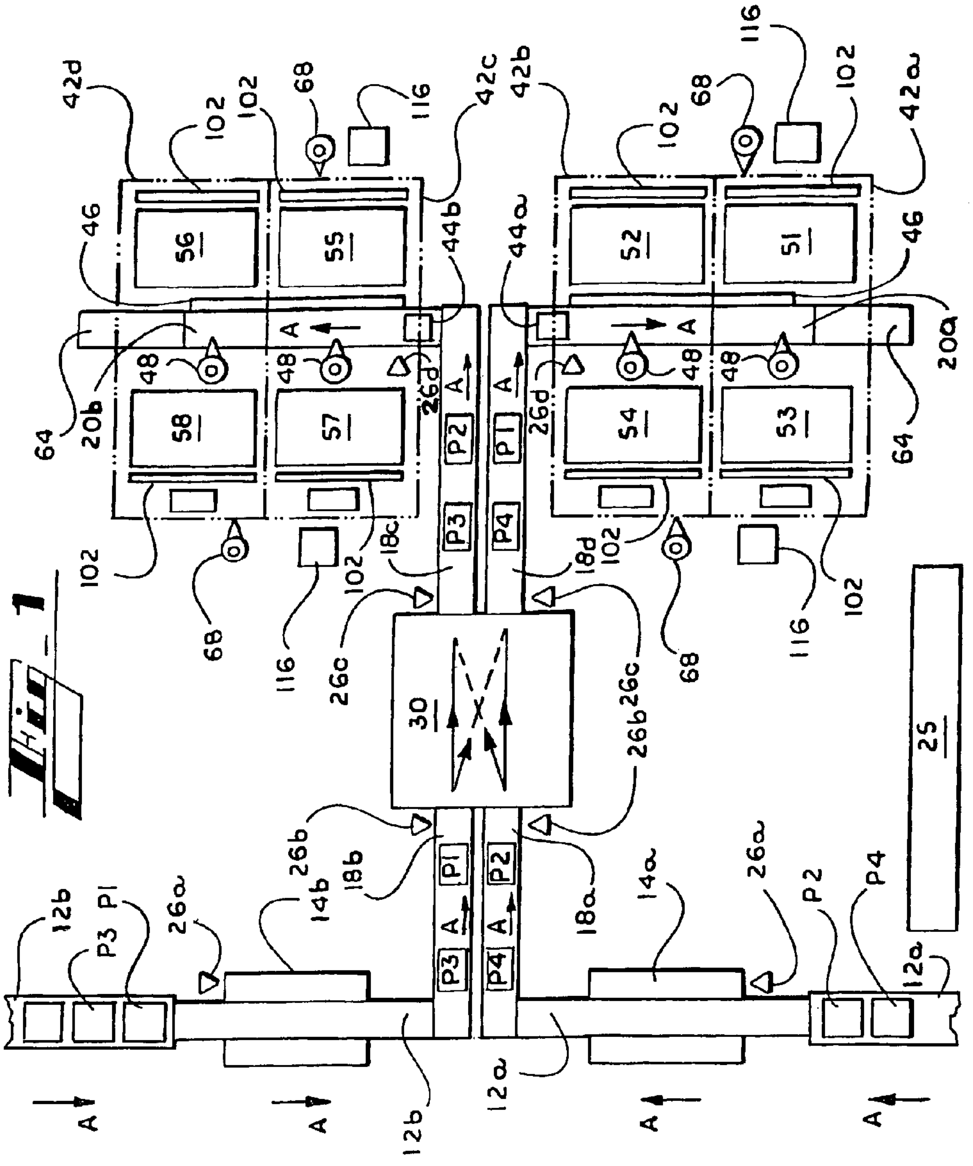
FIG. 1 is a top diagrammatic view of the sorting system embodying the present invention.

Referring now in more detail to the drawings, in which like numerals refer to like parts throughout the several views, FIG. 1 illustrates the present invention—a synchronized parallel sorting system 10. By way of an overview, the sorting system 10 includes powered feed conveyors 12*a*, 12*b*; powered transitional conveyors 18*a*–18*d*; powered sorting conveyors 20*a*, 20*b*; a switching unit 30 for determining which sorting conveyor receives an article; displays 46 perceivable by sorting operators 48; and, destination location clusters 51–58.

The present invention 10 may be reduced or expanded, in whole or in part, to create additional configurations. For example, the embodiment illustrated in FIG. 1 may be reduced by eliminating transitional conveyor 18*c*, sorting conveyor 20*b* and destination location clusters 55–58. Alternatively, from the embodiment illustrated in FIG. 1, transitional conveyors 18*c*, 18*d* may be extended by including additional switching units or destination location clusters to create more complex arrangements.

Turning now to a detailed description of the preferred embodiment shown in FIG. 1, the powered feed conveyors 12*a*, 12*b* transfer articles to be sorted, such as parcels P1–P4, in the direction of arrows A causing the parcels to pass under optical readers 14*a*, 14*b*. Each optical reader 14*a*, 14*b*, positioned at the beginning of the respective feed conveyors 12*a*, 12*b*, scans and captures destination indicia found in the form of alpha-numeric characters, barcode or two-dimensional symbols (such as MaxiCode® symbols), affixed to each parcel. The optical readers 14*a*, 14*b* supply the programmable logic controller (PLC) 25 with destination indicia captured during scanning.

Suitable optical reader systems for imaging destination indicia in the form of multiple symbologies including alphanumeric characters are shown in U.S. Pat. Nos. 5,291,564; 5,308,960; 5,327,171; and 5,430,282 which are all incorporated herein by reference. Systems for locating and decoding bar codes and the MaxiCode® dense code symbology are described in U.S. Pat. Nos. 4,874,936; 4,896,029; 5,438,188; 5,412,196; 5,412,197, 5,343,028; 5,352,878, 5,404,003; 5,384,451; 5,515,447; and, European Patent 0764307 which are all incorporated herein by reference. Other systems known in the art may be appropriate.

The present invention 10 requires synchronization of the parcel flow. Scanning of destination indicia, as well as manual parcel handling, require certain time and spatial intervals between each parcel. Synchronized flow regulators 16 (not shown) maintain a constant ratio of speed between the feed conveyors 12*a*, 12*b*, the transitional conveyors 18*a*–18*d* and the sorting conveyors 20*a*, 20*b*. In a well known manner, the PLC 25 generates a timing signal which synchronizes the package input onto feed conveyors 12*a*, 12*b*. These timing signals also dictate the rate by which parcels will be transferred from feeding conveyors 12*a*, 12*b* to transitional conveyors 18*a*, 18*b*. For example, in the preferred embodiment, parcels are transferred onto each feeding conveyor 12*a*, 12*b* at the rate of thirty per minute. In addition, these timing signals help maintain a pre-set time span between parcels.

Synchronized parcel flow also requires parcels be monitored throughout the sorting system 10. Here, the location of each parcel is monitored by beam photocell transmitters 26*a*–26*d*. The photocells are a retro-reflective type which provide a signal when a parcel passing immediately in front breaks the beam. Transmitters 26*a* mounted immediately upstream of each optical reader 14*a*, 14*b* triggers a "start" signal to the respective reader via PLC 25. When appropriate, transmitters 26*b* mounted immediately upstream of the switching unit 30 trigger a "divert" signal to the switching unit 30 via the PLC 25. Transmitters 26*c* mounted immediately downstream of the switching unit 30 track exiting parcels. Transmitters 26*d* track parcels exiting the transitional conveyors 18*c*, 18*d* and entering sorting conveyors 20*a*, 20*b*.

Rotary belt encoders 28 (not shown) are positioned to measure the displacement of each conveyor 12*a*, 12*b*, 18*a*–18*d*, 20*a*, and 20*b*. In the preferred embodiment, the conveyors are belt or powered roller conveyors. However, for the purpose of this disclosure "conveyor" is used to include any powered or non-powered device that moves, transports or carries articles from one location to another. The PLC 25, in response to the input signals from the transmitters 26*a*–*b*, optical readers 14*a*, 14*b*, and encoders 28, regulates the conveyor speeds and controls the switching unit 30 in a well known manner. Once a particular parcel is associated with an encoder count at a particular location, it can be tracked through the system in a well known manner.

It is understood by those skilled in the conveying arts that many of the elements described above may be readily replaced by other elements. By way of illustration and not limitation, it is well known that other conveyors such as slides or rollers may provide the same function as belt or powered roller conveyors; the parcels may be articles of any size or shape capable of being carried by the conveyors; other characteristics or attributes of the parcels may provide the same function as the destination indicia; other devices or a human operator may provide the same function as the optical readers; other devices or a human operator may provide the same function as the switching unit; and, other devices or a human operator may provide the same function as the PLC.

Feed conveyors 12*a*, 12*b* transfer parcels to transitional conveyors 18*a*, 18*b* in the direction of arrows A to switching unit 30. Throughout the sorting invention 10, directing parcels from one conveyor to another may be accomplished with well known devices such as the powered belt turn described in U.S. Pat. No. 5,439,098, incorporated herein by reference. Other systems known in the art may be appropriate.

Switching unit 30 is a diverting station configured to transfer parcels between conveyors 18*a*, 18*b* and discharge the parcels onto conveyors 18*c* and 18*d*. Suitable switching units are shown in U.S. Pat. Nos. 3,246,733; 5,620,102; 5,291,564; 5,308,960; European Patent 0438667A2; and U.S. patent application Ser. Nos. 08/878,306; 09/200,487, all incorporated herein by reference. Other systems known in the art may be appropriate.

PLC 25 is configured to receive input signals from optical readers 14*a*, 14*b*, representative of the destination indicia captured during scanning. In a well known manner, the PLC 25 matches the destination indicia with a destination location receiver a–x within a destination location cluster 51–58 and creates a unique destination signal S representative of that match. Each destination signal S preferably includes at least three parts: a unique parcel number, the city/state destination of the parcel, and the receiver designation. Thus, each destination signal S forms a unique identifier which permits the PLC 25 to track each parcel and control the sorting system 10 according to parcel location.

For example, after optical reader 14*a* scans parcel P4, PLC 25 selects destination location receiver 52*k* (receiver k within destination location cluster 52) because that receiver is associated with the destination indicia affixed to parcel P4. PLC 25 then generates and assigns a destination signal S4 representative of the association between the receiver 52*k* and parcel P4.

Switching unit 30 is configured to receive the destination signal S transmitted by PLC 25. For example, upon receiving destination signals S1–S4 from PLC 25 regarding parcels P1–P4, the switching unit 30 diverts parcel P1 from transitional conveyor 18*b* to transitional conveyor 18*d* and transfers parcel P2 from transitional conveyor 18*a* to transitional conveyor 18*c*. The result, as illustrated in FIG. 1, yields parcels P2 and P3 on transitional conveyor 18*c*, while parcels P1 and P4 are on transitional conveyor 18*d*. The switching unit 30 has placed these parcels on these conveyors because PLC 25 assigned parcels P2 and P3 receivers downstream of transitional conveyor 18*c*. Likewise, PLC 25 assigned parcels P1 and P4 receivers downstream of transitional conveyor 18*d*.

From transitional conveyor 18*d* parcels P1, P4 are transported to sorting conveyor 20*a*, and from transitional conveyor 18*c*, parcels P2, P3 are carried to sorting conveyor 20*b*. Sorting conveyor 20*a*, spans sequential operating zones 42*a*, 42*b* and sorting conveyor 20*b* spans sequential operating zones 42*c*, 42*d*, as indicated by dashed line borders. Each sequential operating zone 42*a*–42*d* includes a sorting operator 48, a pair of the destination clusters 51–58 positioned on opposite sides of the sorting conveyors 20*a*, 20*b*, and defines the areas wherein parcels are removed from the conveyors 20*a*, 20*b* and transferred to the related destination location receiver a–x within its respective destination cluster pair.

Figure 2:
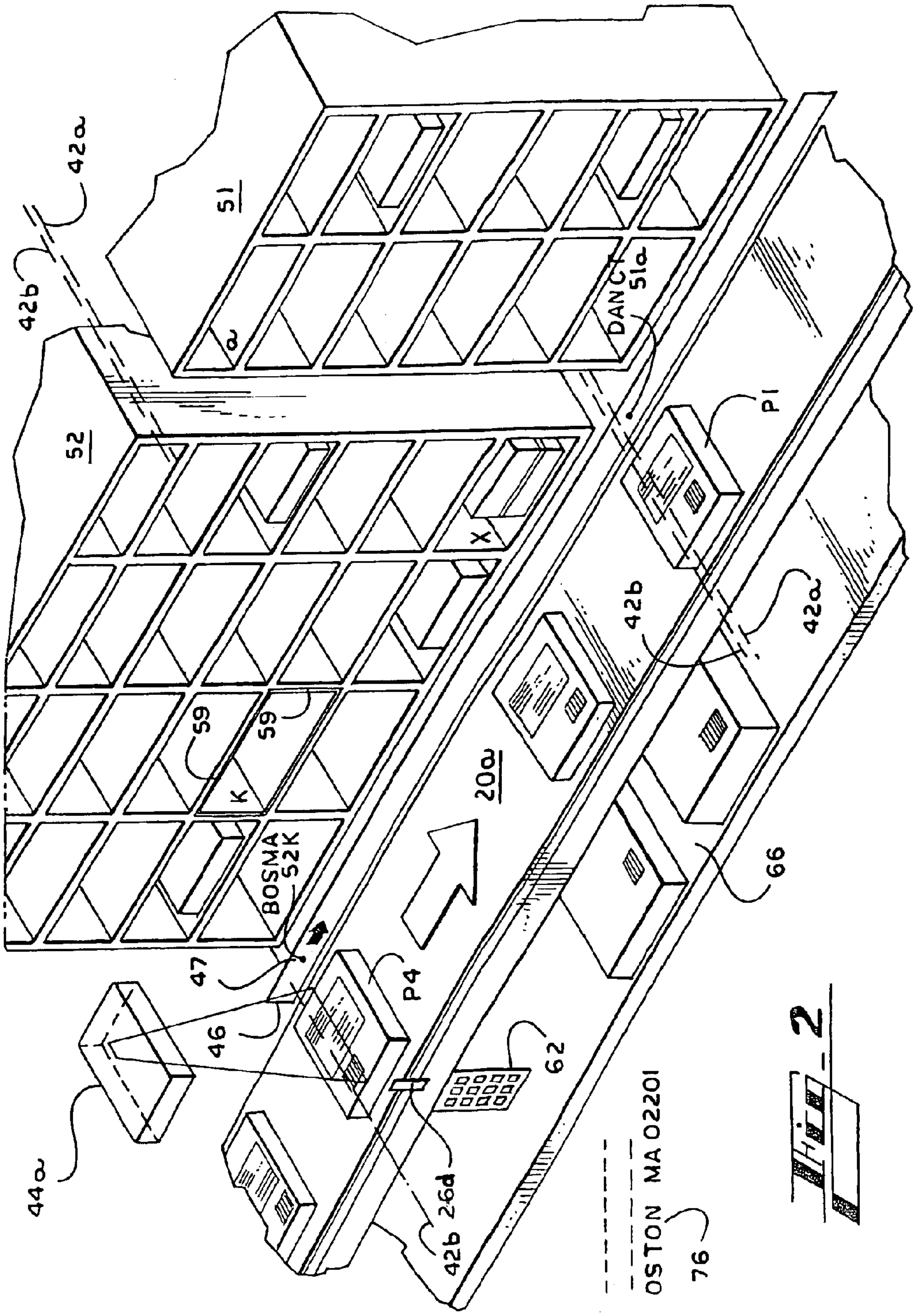
FIG. 2 is a perspective view of a sorting conveyor and certain destination locations, from the viewpoint of the sorting operator, which illustrates the display identifying two articles to be sorted.

As shown in FIG. 1, operating zone 42*a* includes destination clusters 51, 53; operating zone 42*b* includes destination clusters 52, 54; operating zone 42*c* includes destination clusters 55, 57; and, operating zone 42*d* includes destination clusters 56, 58. As shown in FIG. 2, typical destination location cluster 52 comprises a matrix of destination locations receivers a–x, which, in the preferred embodiment, is an array of cubicles or cells positioned in front of and behind the sorting operator 48.

The sorting process will now be described with reference to parcels P1 and P4 on sorting conveyor 20*a*; the sorting of parcels P2 and P3 being identical along sorting conveyor 20*b*.

Mounted immediately adjacent to the sorting conveyor 20*a* is a display 46. As best shown in FIG. 2, the display 46 is a Light Emitting Diode (LED) panel mounted immediately adjacent to the sorting conveyor 20*a*. The display 46 is configured to transmit dynamically moving alpha-numeric characters under programmed control, much like an electronic ticker-tape. In other words, the display will present characters which visually cascade or appear to travel in succession down the LED panel at the same speed as the articles travel down the conveyor. The display 46 may also be configured to present multiple colors, and to cause the alpha-numeric characters to flash or blink.

The display 46 is also configured to receive a destination signal S from the PLC 25 and, in a well known manner, convert the destination signal S into alpha-numeric characters identifying the parcel that is entering the sorting conveyor 20*a*. To accomplish this, immediately upon a parcel entering the sorting conveyor 20*a* photo-cell transmitter 26*d* signals the optical readers 44*a* to again scan the parcel. This second scanning step triggers the PLC 25, in a well known manner, to transmit the destination signal S to the display 46 where two parts of the destination signal S, the city/state designation and the receiver designation, are presented.

As described below, including possible variations, a parcel's complete city/state designation and receiver designation are presented when the parcel enters the operational zone which contains the associated destination location and is ready to be placed therein. To continue the example presented above, destination signal S4 is representative of the association between destination location receiver 52*k* and parcel P4. As illustrated in FIG. 2, signal S4 received from the PLC 25 is presented on display 46 as the dynamically moving city/state designation and receiver destination "BosMa 52k," designated 47. Here, "BosMa" refers to the city and state captured from the destination indicia and "52k" refers to the destination location receiver wherein parcels destined for Boston, Mass., are deposited. The designation 47, remains alongside and substantially close to each parcel as the parcel is transported along the sorting conveyor 20*a*. In the preferred embodiment, the designation 47 is flashing to further identify the parcel to be sorted. Only the designation 47 is flashing, although, as described below, other information may appear on the display 46.

Each sorting operator 48 is positioned between each set of opposite facing destination clusters 51, 53, or 52, 54, such that the parcels P1, P4 on conveyor 20*a* are within comfortable reach, the display 46 is easily visible, and the destination location receivers a–x are within comfortable reach. As parcel P4 enters sequential operating zone 42*b* it passes in front of photocell 26*d*, breaking the beam triggers a signal to the optical reader 44*a* to scan the parcel. Upon scanning the destination indicia affixed to the parcel, a signal is sent to the display 46 via PLC 25 to broadcast signal S4, the parcel information "BosMa 52k" 47 representative of parcel P4. Simultaneously, the perimeter of destination cell k within cluster 52 is illuminated.

Installed around the perimeter of each destination receiver are illumination strips 59. Each strip, constructed of LED lights encased in a protective covering, may be illuminated by a signal from the PLC 25. When a parcel destined for a specific receiver enters the related operating zone and is ready to be placed within the receiver, the perimeter of that receiver is illuminated by the strips 59. Those skilled in the art will perceive many suitable alternative marking systems, such as fluorescent lamps, light pipes, fiber optics, or a light at each corner of the receiver.

At this point in the sorting process, where the display 46 presents flashing parcel information 47 and the perimeter of receiver 52*k* is illuminated, the sorting operator 48 is visually alerted by display 46 that parcel P4 destined for Boston, Mass., should be placed in receiver k within cluster 52. In response, the sorting operator 48 removes the parcel P4 from the conveyor 20*a* and places it in receiver k within cluster 52.

Receiver 52*k* will remain illuminated and the parcel identification 47 will remain visible until PLC 25 receives either an appropriate signal from an sorting operator 48, as explained below, or the parcel exits the related operating zone 42*b*. For address verification, sorting operator 48 compares designation 47 with the destination indicia on a parcel. The operator places a "wrong" package in a storage area described below, and may stop the entire sort process if there is no match for two sequential parcels. Thus possible system errors are eliminated. Such errors may occur on each sorting stage including label and bar code reading and destination container number computing.

To confirm the parcel P4 has been correctly placed, and to cancel the particular designation "BosMa 52k" 47 from the display 46, the operator 48 presses a code on a keyboard 62. The code, received by PLC 25, cancels the designation 47 and strips 59. Alternatively, a headset having a microphone in communication with the PLC 25, which is capable of both voice recognition and voice synthesis, may be substituted for the keyboard 62. The sorting operator 48 may verbally signal the PLC 25 that the article has been placed by speaking into the microphone, from which the PLC 25 receives and considers an order to cancel the designation 47 and illumination strips 59.

Parcel P1, destined for Danbury, Conn., was scanned at the reader 44*a* prior to the parcel P4, and has been assigned receiver a within cluster 51 by the PLC 25. In the manner described above for parcel P4, the sorting operator 48 in operating zone 42*a* places parcel P1 within cell 51*a* and cancels the designation "DanCt51a" by entering the appropriate code on keyboard 62. Further operation of the system with regard to parcel P1 in zone 42*b* is described below.

In the preferred embodiment the operator 48 is a human. Thus, the conveyor length within each operating zone 42*a*, 42*b* is approximately seven to eight feet long. It will be understood by those skilled in the conveying art that the functions of a human sorting operator 48 and display 46 may be replaced by other elements. By way of illustration and not limitation, an audible signal, beam of light, or some other perceptible signal which can be received by a human or human assisting device may provide the same function as the LED display 46. Similarly, a mechanical arm or robot may work in conjunction with or under the control of a human operator.

As described above, the sorting operator 48 may place a parcel in the designated receiver a–x. As described below, the sorting operator 48 may permit the parcel to continue to the end of the sorting conveyor 20*a* where the parcel will be discharged into a storage container 64, shown in FIG. 1, or the parcel may be removed from the sorting conveyor 20*a* and placed on a storage shelf 66, shown in FIG. 2.

Each destination location cluster 51–54, is accessible from the back by a packing operator 68. As described below, the purpose of the packing operator is to remove parcels from the destination receivers and load them into transportation boxes 116.

Figure 3:
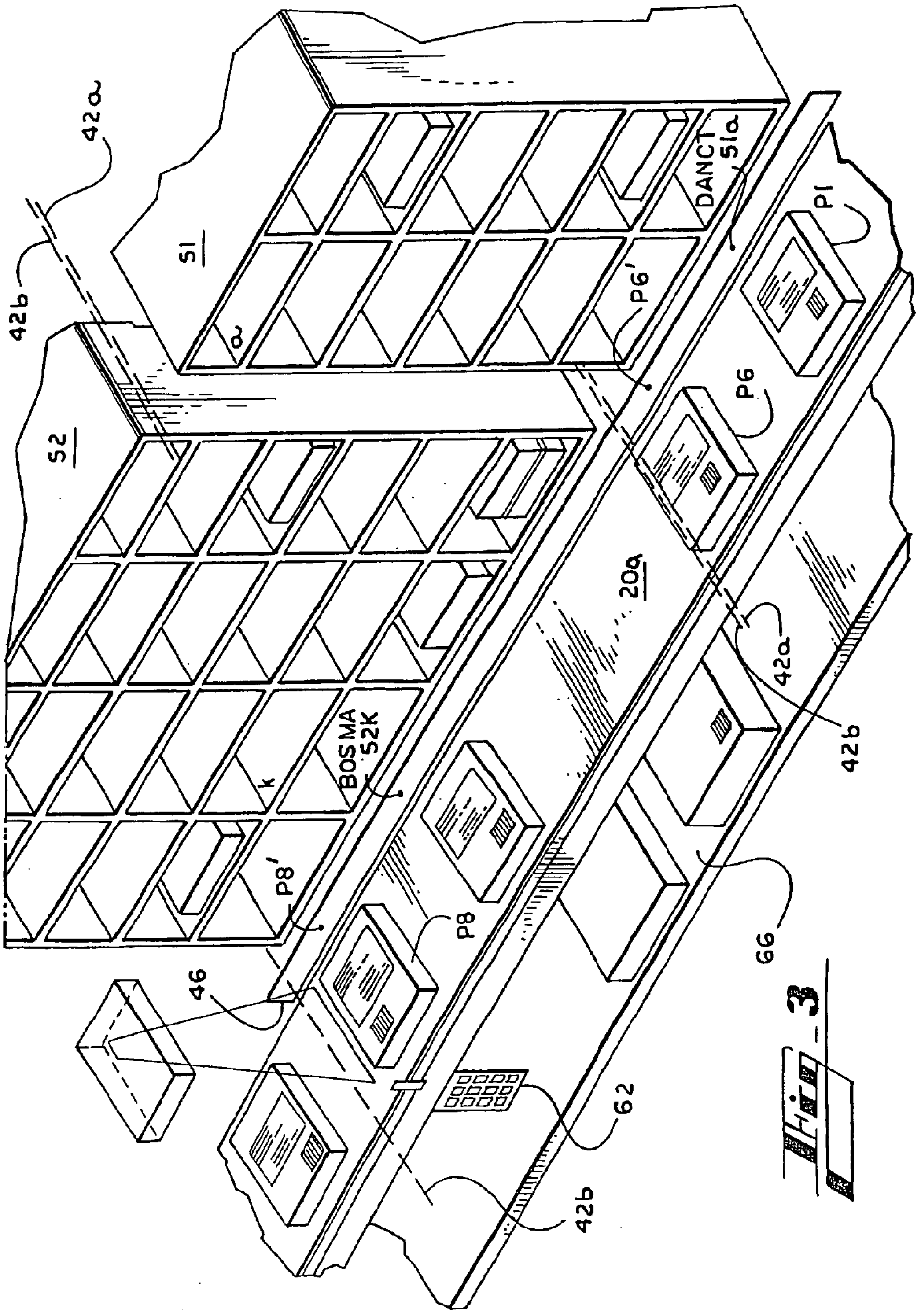
FIG. 3 is a perspective view of a sorting conveyor and certain destination locations, from the viewpoint of the sorting operator, which illustrates a display variation wherein one article is waiting to be sorted and a second article in on the conveyor in error.

FIG. 3 further illustrates operation of the display 46 shown in FIG. 2. Parcels P6 and P8 have entered operating zones 42*a* and 42*b*, respectively. For the purpose of this description, parcels P6 and P1 are both addressed to Danbury, Conn. Parcel P8 is on conveyor 20*a* in error, the result of a poorly written address label. Parcel identification number P6' is the designation on display 46 adjacent to parcel P6. Parcel identification number P8' is the designation on display 46 adjacent to parcel P8. As described above, each destination signal S preferably includes at least three parts: a unique parcel number, the city/state destination of the parcel, and the receiver designation. The parcel identification number is the third part of the destination signal S.

The designations P6' and P8' identify the parcel, but not a related receiver. The destination locations for neither P6 nor P8 appear on the display 46 because the first parcel P6 is waiting in zone 42*a* for the previous parcel P1 to be processed. The destination location for parcel P8 does not appear on the display because it does not belong in operating zone 42*b*. Thus, neither parcel is ready to be placed within an associated receiver. In the case of parcel P6, once parcel P1 is placed and the code entered to cancel the associated designation, the destination location information for P6 will be presented flashing on display 47. As may also be illustrated with parcel P6, the display 46 will not present the destination designation until the parcel P6 has entered the operating zone which includes the related receiver. Once it does enter the associated operating zone, the destination designation will be presented and parcel P6 may then be placed within receiver 51*a*.

In the case of parcel P8, the operator may permit it to be discharged in storage area 64 or remove and place it on the storage shelf 66. The sorting operator then cancels the designation P8'. Those parcels received by storage area 64 or placed on storage shelf 66 may be scanned with a hand-held bar code scanner (not shown) at a later time to determine the related receiver.

Figure 4:
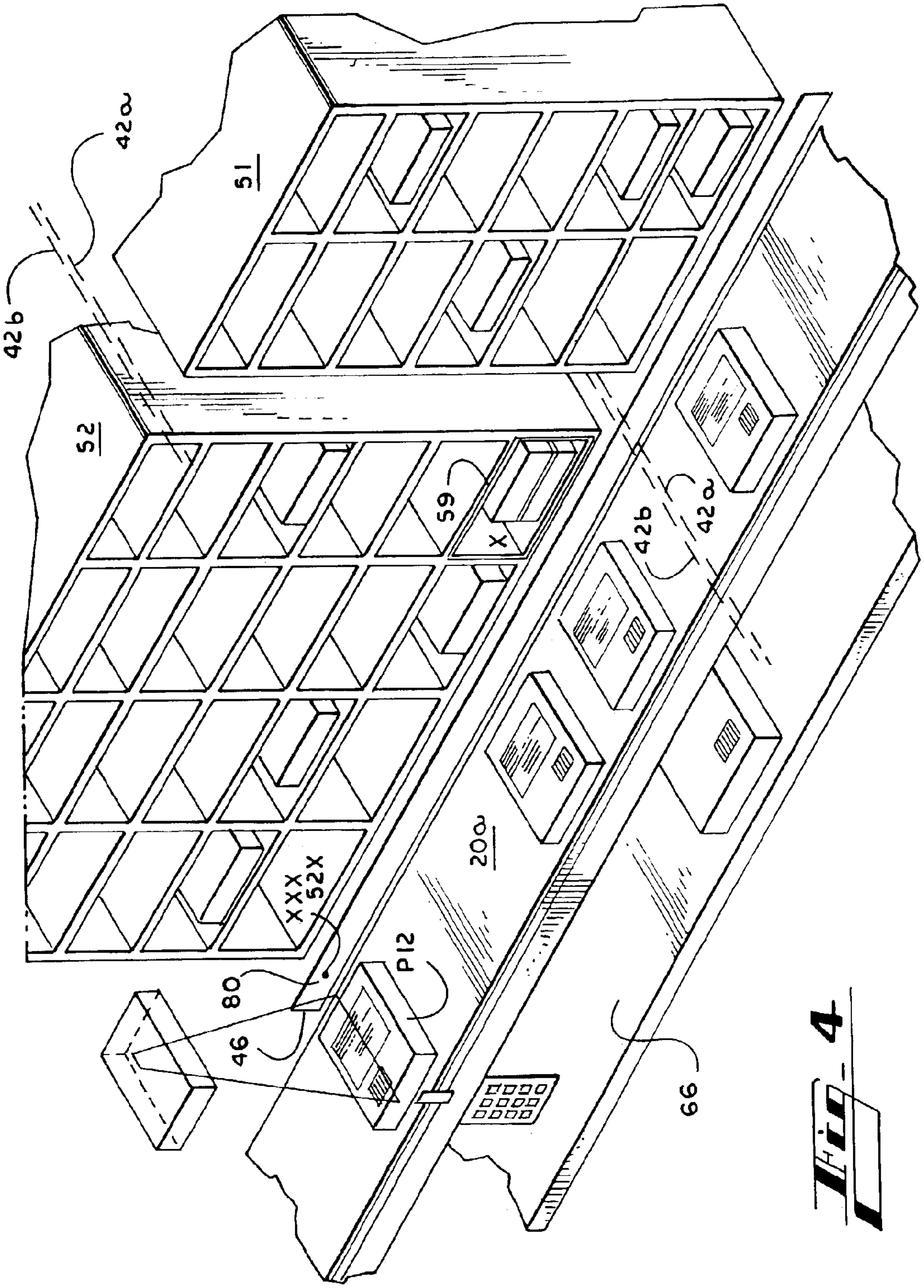
FIG. 4 is a perspective view of a sorting conveyor and certain destination locations, from the viewpoint of the sorting operator, which illustrates a display variation wherein the related destination location is full.

FIG. 4 further illustrates operation of the display 46 shown in FIG. 2. Here, parcel P12 is identified by the designation "XXX52x" 80 instead of the usual parcel designation information. This unique signal means that a predetermined number of parcels in the receiver 52*x* has been reached, that is, cell 52*x* is full. As there is no room in 52*x*, parcel P12 and any subsequent parcels marked in a similar manner must be placed in storage 64 or 66 until receiver 52*x* has been emptied by the packing operator 68 as described below. In expectation of a full receiver, the sorting operator 48 can send a "receiver is full" message to the PLC 25 by entering the receiver's designation on the keyboard 62.

Figure 5:
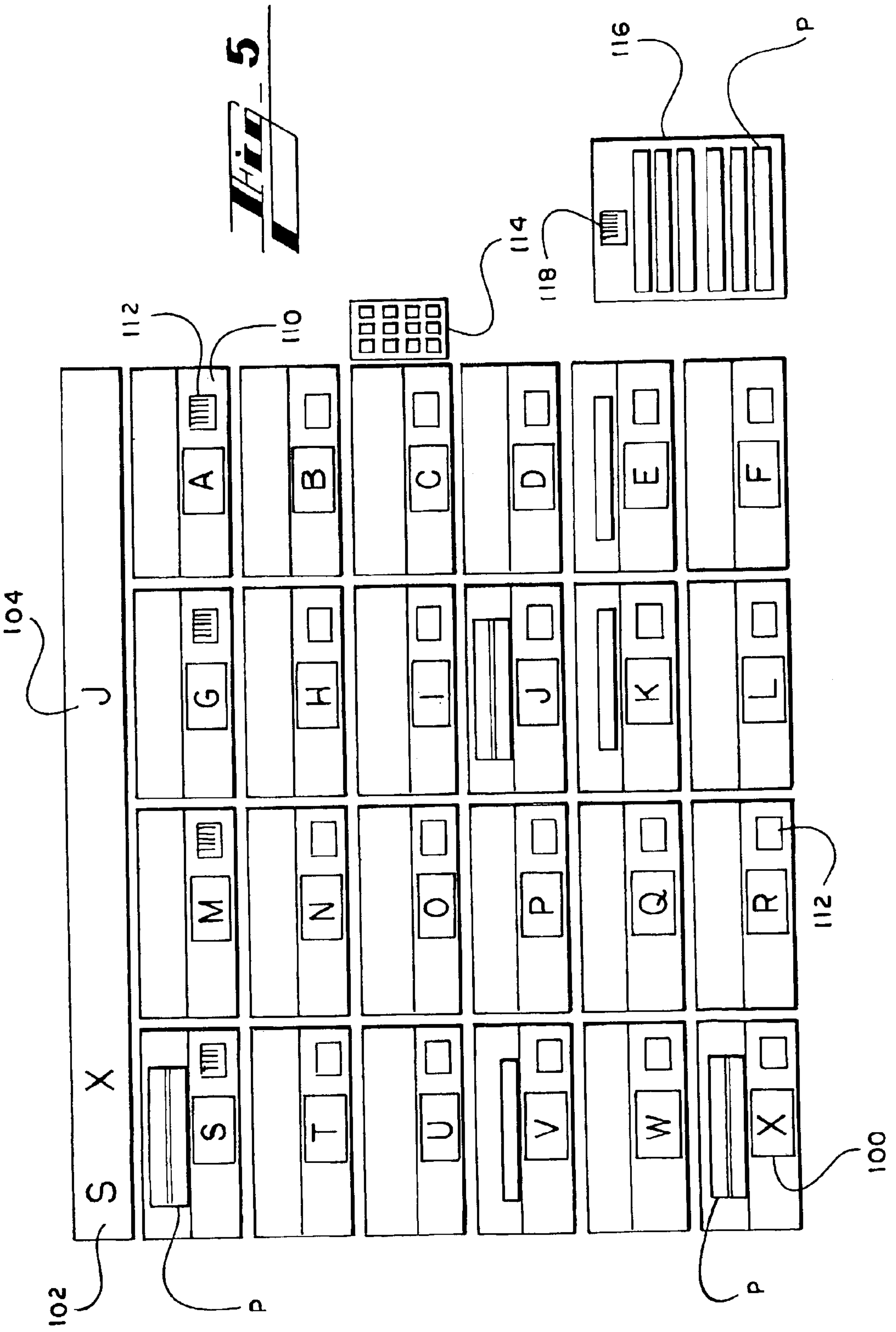
FIG. 5 is a rear elevation view of a typical destination location cluster.

FIG. 5 is an elevation view illustrating the rear of a typical destination location cluster. Location receivers are identified from the back with a label 100. An LED display screen 102, which may be identical to the display 46 described above, is positioned immediately above the top row of destination receivers a–x. Also positioned at the rear of each destination location are receiver back door 110 and receiver bar code label 112. There is a keyboard 114 located at the back of each destination location cluster 51–58.

When a specific receiver is full, as described above with regard to 52*x*, the display 102 presents a receiver designation 104. Here, the designation 104 is limited to the receiver number because the packing operator 68 is concerned only with which receiver is full. Upon observing the "full" message, the packing operator 68 transfers all the parcels from the full receiver to an adjacent transportation container 116.

In operation, the display 102 presents the numbers of those destination receivers that are full. As shown in FIG. 5, cells s, x, and j are full. But for the purpose of this disclosure, only receiver j is referenced. In response, the packing operator 68 hand-scans the j label 112, with a hand-held bar code scanner (not shown), or enters the j designation on the keyboard 114. The signal generated by the scanner or keyboard is stored by the PLC 25.

The packing operator 68 then opens the j door 110 and removes those parcels into adjacent transportation container 116 while counting the total number of parcels placed therein. The packing operator 68 enters that number on the keyboard 114. In a well known manner, the signal representative of the parcels placed in container 116 is stored by the PLC 25 with the signal representative of cell j.

Packing operator 68 then scans a transportation container bar code label 118 affixed to the transportation container 116. In a well known manner, the signal representative of the transportation container 116 is stored by the PLC 25 with the two previous signals, namely, the destination location obtained from label 112 and the total number of parcels placed in the container 116. Together, these three signals are stored by the PLC 25 for the purpose of tracking subsequent parcel movement and location. This last scanning step causes the designation 104 to be deleted from display 102. As noted earlier, the keyboard entry steps may be replaced by voice data entry.

Figure 7:
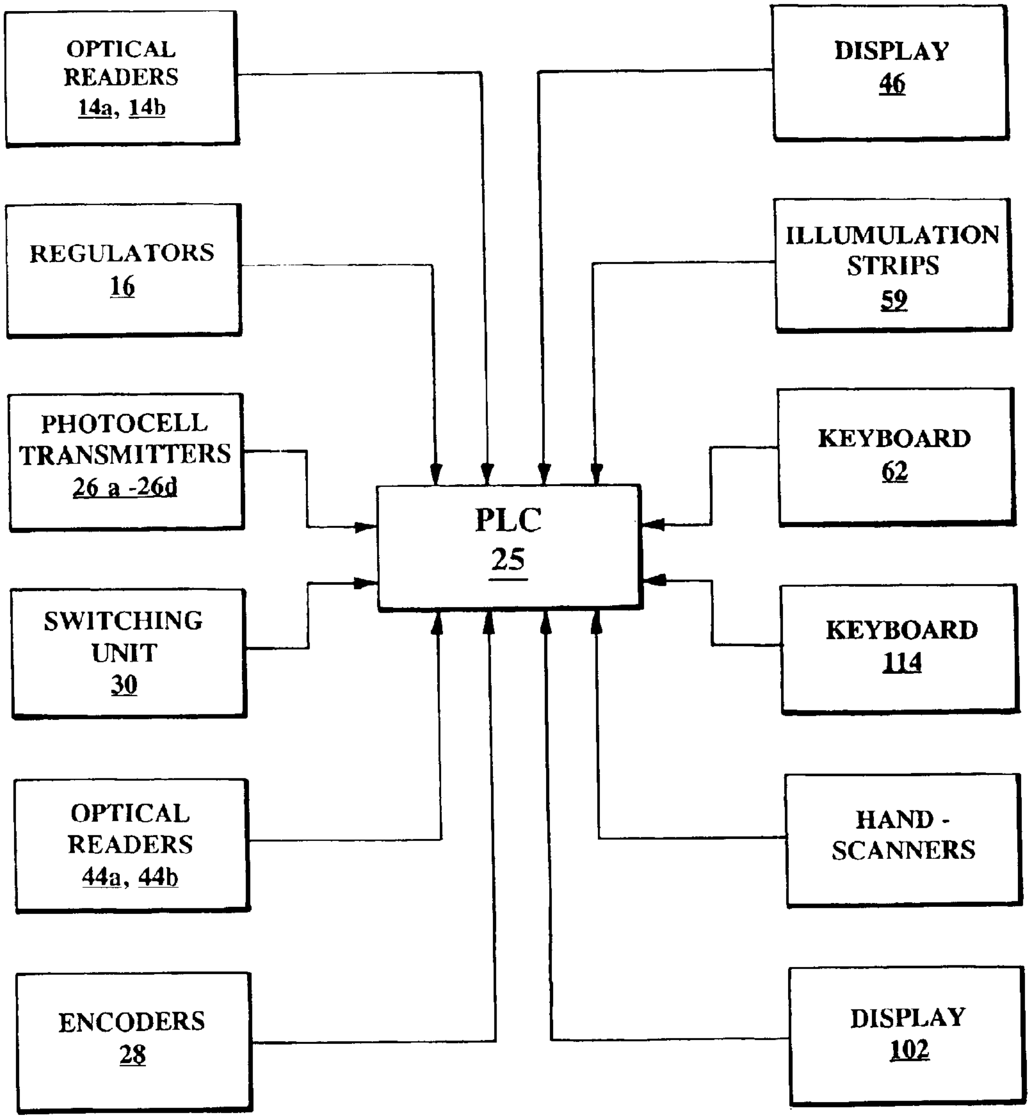
FIG. 7 is a block diagram of the control system used for operation of the sorting system, under control of a programmable controller.

Referring to the block diagram of FIG. 7, the operation of the sorting system 10 is automated by the programmable logic controller (PLC) 25. The PLC may receive input signals from the optical readers 14*a*, 14*b*, 44*a*, 44*b* that read alpha-numeric characters, barcode or two-dimensional symbols (such as MaxiCode® symbols) on the parcels. Such a symbol may contain address information that allows the PLC to determine, in a well known manner, which is the correct conveyor 18*c*, 18*d* to transfer the parcel to the appropriate sorting conveyor 20*a*, 20*b*. Photocell transmitters are positioned to detect the position of parcels, the output of those photocells is input to the PLC 25. The PLC may also receive information about the parcel P directly from other sensors (not shown), such as a scale or a device for measuring the parcel's dimensions. Rotary belt encoders 28 are positioned to measure the displacement of each conveyor 12*a*, 12*b*, 18*a*–18*d*, 20*a*, 20*b* and the output of these encoders 28 is input to the PLC. Parcel information may also be manually entered at keyboards 62, 114. The PLC, in response to these input signals, sends control signals to the switching unit 30 which transfers articles between conveyors, and to displays 46, 102 and strips 59 which identify parcels and location destinations.

Alternative Embodiment

Figure 6:
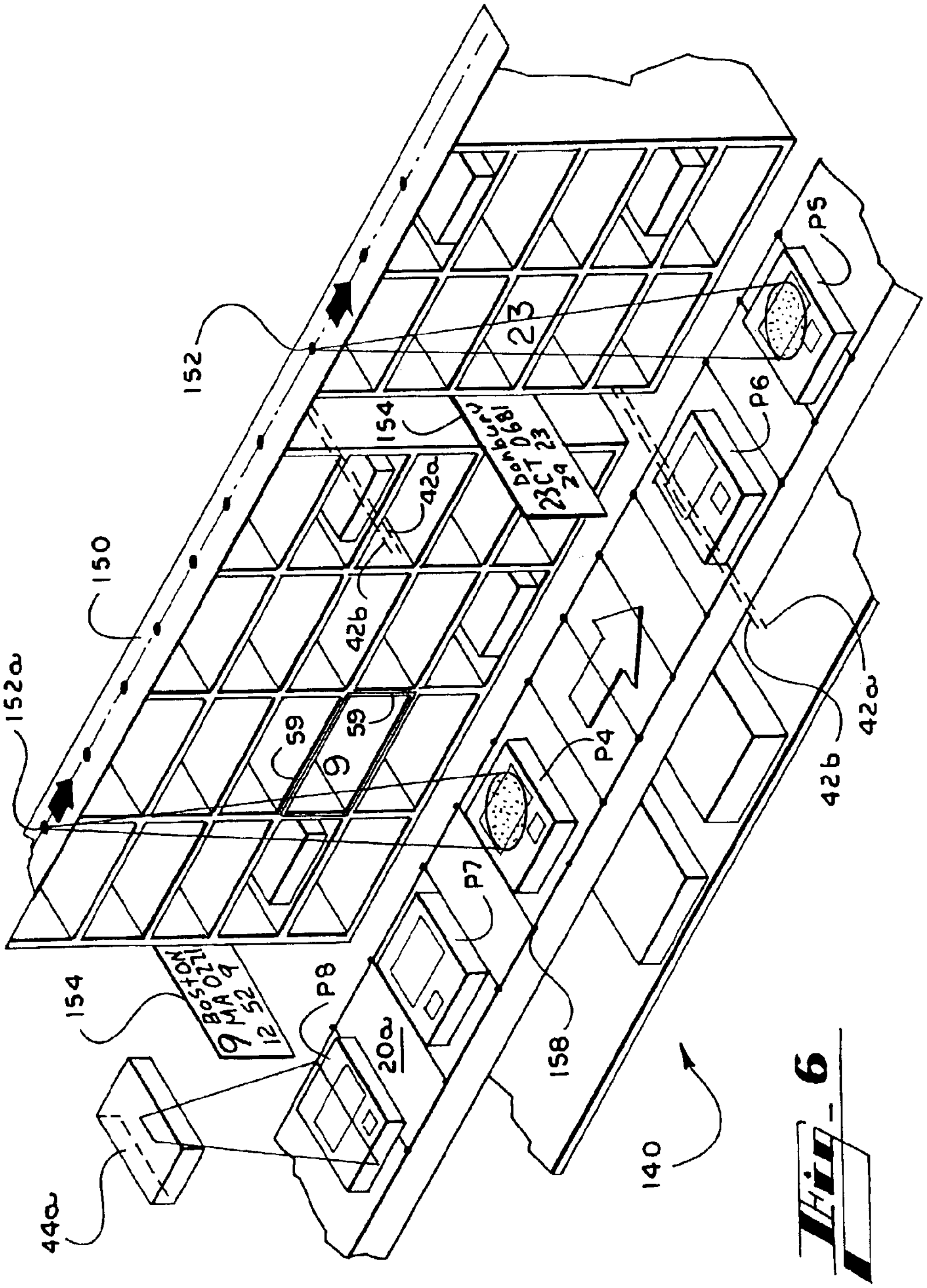
FIG. 6 shows an alternative embodiment of the present invention, a detached indicator constructed of an overhead projection unit.

FIG. 6 illustrates an alternative embodiment of a sorting system 140 with a detached indicator. Generally speaking, an overhead projection unit 150 includes lamps 152 that cast a sharply focused beam of light on a parcel to be sorted. Like the designation 47 described above, the beam of light acts as a visual indicator to sorting operator 48. A stationary window display 154, mounted at the end of each row of receivers, presents related destination information.

More specifically, mounted immediately above the sorting conveyors 20*a*, 20*b* is an overhead projection unit 150. As the sorting conveyors 20*a*, 20*b* are identical, the sorting process will now be described with reference to only sorting conveyor 20*a*. Each projection unit 150 is the length of the conveyor 20*a* and includes a plurality of small lamps 152. In the preferred embodiment, the lamps are light emitting diodes (LEDs) mounted from one to five inches (1"–5") apart. Each LED 152 is positioned so that when illuminated, it casts a beam of light toward the surface of the conveyor 20*a*.

Like the LED display screen 46 described above, the LEDs 152 are configured to present a dynamically moving sequence of light beams under programmed control. Here, each LED 152 will shine on a parcel for a brief time as that parcel passes beneath on the sorting conveyor 20*a*. The LEDs 152 are illuminated by the PLC 25 at the same speed as the conveyor 20*a*. In this manner, the LEDs 152 cooperate to create a visual effect wherein it appears a beam of light remains focused on a parcel as it travels down the conveyor.

Mounted at the end of each row of receivers is a window display 154. As illustrated in FIG. 6, the window display 154 is a Light Emitting Diode (LED) display panel mounted within a stationary frame extending outwardly from the array of receivers. The display 154 is preferably configured to transmit or present at least three lines of alpha-numeric characters. Like display 46 described above, display 154 is also configured to receive a destination signal S from the PLC 25 and, in a well known manner, convert the destination signal S into alpha-numeric characters which present sorting information.

The first line of display may include the receiver designation. Here, that is cell number nine. As cell nine is associated with Boston, Mass., and more specifically with zip code 02201, the first and second lines present that information under the control of PLC 25. The third line is a dynamically moving list of destination cells in sequential order which reflect the destination cells of the parcels that follow.

In operation, immediately upon a parcel entering the sorting conveyor 20*a*, optical reader 44*a* again scans the parcel. For example, destination signal S4 is representative of the association between destination location cell nine and parcel P4. Upon scanning the destination indicia affixed to parcel P4, a signal is sent to the display 154 via PLC 25 to transmit signal S4, the cell destination number nine and parcel information "Boston Mass. 02201" representative of parcel P4. Simultaneously, the perimeter of destination cell nine is illuminated by strips 59 in the same manner as described above and the lamp 152*a* immediately above parcel P4 is illuminated to cast a beam of light onto parcel P4.

At this point in the sorting process, when the display 154 presents parcel P4 information and the perimeter of cell nine is illuminated, the sorting operator 48 is visually alerted that parcel P4 destined for Boston, Mass., should be placed in cell nine. In response, the sorting operator 48 removes the parcel P4 from the conveyor 20*a* and places it in cell nine.

An array of photo-beam sensors 158, of the type described above, are positioned with their transmitters and receptor on opposite sides of the conveyor 20*a*. In the preferred embodiment, the sensors 158 are located one to five inches (1"–5") apart, centered directly under a lamp 152. Here, the sensors 158 track the position of parcels within each operating zone 42*b*, 42*a* and act as off/on controls for the lamps 152.

Continuing the example of parcel P4 shown in FIG. 6, as parcel P4 is transported along conveyor 20*a* it breaks the beam of each sensor 158. Each breaking of the photocell beam signals to the LED 152 mounted immediately overhead, via the PLC 25, to become illuminated. In this manner, an almost continuous beam of light remains focused on parcel P4 while it is on the conveyor 20*a*. Once parcel P4 is removed from the conveyor 20*a*, the next photocell is not broken. Thus, the LED 152 immediately above the unbroken photocell beam remains off as do all the subsequent LEDs.

In operation, a sorting operator 48 may have before him or her a continuous line of parcels on the sorting conveyor 20*a*. Each parcel will be tracked by a beam of light cast from a respective LED 152, and the display 154 will include a list of destination cells ordered to correspond to the parcel sequence. Where a photocell beam is broken, the lamp immediately is illuminated. Where a photocell beam is not broken, the lamp immediately above remains in the normally off condition. Further, when a parcel has been removed from the conveyor, the next photocell beam is unbroken. This unbroken beam causes a signal to be sent to the PLC 25 that the parcel has been placed. In response, the PLC 25 presents the sorting information for the next parcel.

Like the display 46 described above, display 154 presents the destination cluster and sorting information only when a parcel is within the associated destination cluster and ready to be placed in the associated receiver. In the example of FIG. 6, parcels P4 and P5 are within their associated operating zones, 42*b*, 42*a*, respectively, and are ready to be placed. Thus, each display 154 presents the sorting information related to those parcels. On the other hand, parcels P6–P8 are designated only by their associated destination receivers, "29," "52," and "12" respectively. After parcel P4 has been placed, the designation "9 Boston Mass. 02201" will be replaced with the cell designation number "2" and related destination information for the next parcel following P4. Here, it is cell designation "52" or that is the next cell number presented on the third line of display 154. The second parcel following P4 is designated for cell "12" and is processed in the same manner. Parcels PS and P6 are processed in a like manner.

The alternative embodiment describes one configuration by which a detached indicator moves in a manner corresponding to the movement of a parcel and relates the parcel to an associated destination location. To those skilled in the art, it will be readily apparent that other configurations can fulfill the same purpose. By way of example and not limitation, lamps mounted overhead and attached to an endless drive assembly may individually illuminate and track, that is, remain continuously aimed, on a specific parcel until that parcel is removed from the conveyor. Similarly, lamps mounted overhead may be pivotally mounted and motor controlled to cast a beam of light in an arc. In this manner, each lamp may cast a moving beam of light which follows the parcel for a certain distance until the parcel reaches the beam from the adjacent lamp. In these examples, a detached indicator moves in a manner corresponding to the movement of the parcel to an associated destination location.

In the preferred or alternative embodiment, the sorting systems described above assist the manual sorting operator by eliminating redundant procedures such as hand-scanning and parcel labeling; by establishing communication between an operator and the control system, as well as between operators; by reducing mis-sort errors; by providing system flexibility in that the number of operators and destination locations can be adjusted to reflect operating volume; and by providing a system which requires only minimum training of the new operator. These systems are particularly well suited for small and middle-size parcel sorting facilities that service many destination locations or have significant fluctuations in operating volume.

Those skilled in the art will understand that the programs, processes, methods, etc. described herein are not related or limited to any particular computer or apparatus. Rather, various types of general purpose machines may be used with programs constructed in accordance with the teaching described herein. Similarly, it may prove advantageous to construct specialized apparatus to perform the method steps described herein by way of dedicated computer systems with hard-wired logic or programs stored in nonvolatile memory, such as read only memory.

While the present invention in its various aspects has been described in detail with regard to preferred embodiments thereof, and an example of an alternative embodiment has been provided, it should be understood that variations, modifications and enhancements can be made to the disclosed apparatus and procedures without departing from the scope of the present invention as defined in the appended claims.

What is claimed is:

1. An apparatus for identifying and designating an article for sorting by an operator, comprising:

a conveyor positioned to transport said article to said operator; and an indicator programmed to move along said conveyor with said article and to relate said article to a destination location.

2. The apparatus of claim 1, further comprising an optical reader positioned to capture destination indicia affixed to said article.

3. The apparatus of claim 2, further comprising a controller operative to receive a signal from said optical reader corresponding to said destination indicia, assign a destination location to said article based on said signal, and generate a destination signal associated with said destination location.

4. The apparatus of claim 3, further comprising a plurality of feed conveyors which direct said article to a switching unit.

5. The apparatus of claim 4, wherein said switching unit is configured to divert said article between said feed conveyors in response to said destination signal from said controller.

6. The apparatus of claim 1, wherein said indicator comprises a set of dynamically moving alpha-numeric characters presented on a display device positioned along a length of said conveyor, said characters representative of said destination location associated with said article.

7. The apparatus of claim 1, wherein said destination location is configured to present a perceptible signal in response to approach of said associated article.

8. The apparatus of claim 7, wherein said indicator moving along said conveyor and said perceptible signal presented by said destination location are canceled after said associated article is transferred to said destination location.

9. The apparatus of claim 1, wherein said indicator comprises a means for illuminating said article, said destination location being marked while said article is illuminated.

10. The apparatus of claim 1, further comprising:

a second indicator programmed to move along said conveyor with a second article and to relate said second article to a second destination location.

11. The apparatus of claim 10, wherein said articles and said indicators move contemporaneously along said conveyor.

12. An apparatus for identifying and designating an article for sorting by an operator, comprising:

a conveyor positioned to transport said article to said operator;

an optical reader positioned to capture destination indicia affixed to said article;

a controller operative to receive a signal from said optical reader corresponding to said destination indicia, assign a destination location to said article based on said signal, and generate a destination signal associated with said destination location;

a switching unit configured to divert said article selectively between said conveyor and an adjacent conveyor in response to said destination signal; and an indicator programmed to move along said conveyor with said article and to relate said article to said destination location;

said destination location being configured to transmit a perceptible signal when said associated article is substantially close to said destination location.

13. The apparatus of claim 12, where said indicator comprises a set of dynamically moving alpha-numeric characters presented on a display device positioned along a length of said conveyor, said characters representative of said destination location associated with said article.

14. The apparatus of claim 12, wherein said indicator moving along said conveyor and said perceptible signal presented by said destination location are canceled when said article is transferred to said destination location.

15. An apparatus for identifying and designating an article for sorting by an operator, comprising:

a conveyor positioned to transport said article to said operator; and a moving display programmed to move along said conveyor with said article and to relate said article to a destination location.

16. The apparatus of claim 15, wherein said moving display comprises a set of dynamically moving alphanumeric characters that are representative of said destination location associated with said article.

17. The apparatus of claim 16, wherein said set of moving characters remains substantially within a predetermined distance from said article as said article is conveyed toward said operator.

18. A method of designating and sorting an article, comprising the steps of:

conveying said article toward a plurality of destination locations;

determining a related destination location for said article;

projecting an indicator from an adjacent location toward said article, said indicator programmed to relate said article to said destination location;

moving said indicator along a path followed by said article as said article is conveyed towards said related destination location; and sorting said article to said related destination location.

19. The method of claim 18, wherein said step of sorting further comprises the steps of transferring said article between, and removing said article from, a plurality of conveyors.

20. The method of claim 18, wherein said related destination location is configured to present a perceptible signal when said related article approaches said destination location.

21. An apparatus for identifying and designating an article for sorting by an operator, comprising:

a conveyor positioned to transport said article to said operator; and an indicator programmed to move along said conveyor with said article and to relate said article to a destination location, said indicator remaining substantially within a predetermined distance from said article as said article travels toward said operator.

22. The apparatus of claim 21, wherein said indicator remains substantially close to said article as said article travels toward said operator.

23. An apparatus for identifying and designating an article for sorting by an operator, comprising:

a conveyor positioned to transport said article to said operator;

an optical reader positioned to capture indicia affixed to said article;

a controller operative to receive a reader signal from said optical reader corresponding to said indicia, assign a destination location to said article based on said reader signal, and generate a destination signal associated with said destination location; and a display device positioned along a length of said conveyor and configured to present dynamically moving alpha-numeric characters under programmed control;

said display device operative to receive said destination signal from said controller and to present alpha-numeric characters corresponding to said destination signal in association with said article, said display device programmed to move said alpha-numeric characters corresponding to said destination signal with said article as said article travels toward said operator.

24. The apparatus of claim 23, wherein said display device is operative to receive a second destination signal associated with a second article from said controller and to present alpha-numeric characters corresponding to said second destination signal in association with said second article, said display device programmed to move said alpha-numeric characters corresponding to said second destination signal with said second article as said second article travels toward said operator.

25. The apparatus of claim 24, wherein said articles and said alpha-numeric characters corresponding to said respective destination signals move contemporaneously along said conveyor.

26. The apparatus of claim 23, wherein said destination location is configured to transmit a perceptible signal in response to approach of said associated article.

27. The apparatus of claim 26, wherein the transmission of said perceptible signal comprises illuminating one or more illumination strips positioned around a perimeter of said destination location.

28. An apparatus for identifying and designating an article for sorting by an operator, comprising:

a conveyor positioned to transport said article to said operator;

an optical reader positioned to capture indicia affixed to said article;

a controller operative to receive a reader signal from said optical reader corresponding to said indicia, assign a destination location to said article based on said reader signal, and generate a destination signal associated with said destination location;

a stationary display device operative to receive said destination signal from said controller and to present said destination signal to said operator in human-perceptible form, said stationary display device positioned proximate to said destination location within said operator's field of view; and a projector programmed to project a beam of light moving with said article along said conveyor.

29. The apparatus of claim 28, wherein said destination location is configured to transmit a perceptible signal in response to approach of said article.

30. The apparatus of claim 29, wherein the transmission of said perceptible signal comprises illuminating one or more illumination strips positioned around a perimeter of said destination location.

31. An apparatus for identifying and designating an article for sorting by an operator, comprising:

a conveyor positioned to transport said article to said operator; and a projector programmed to project a beam of light moving with said article along said conveyor and to relate said article to a destination location.

32. A method of designating and sorting an article, comprising the steps of:

conveying said article toward a plurality of destination locations;

determining a related destination location for said article;

displaying a set of alpha-numeric characters on a display device positioned proximate a path followed by said article as said article is conveyed towards said related destination location, said characters programmed to relate said article to said destination location;

moving said set of alpha-numeric characters across said display device in a manner programmed to correspond to the movement of said article along said path followed by said article as said article is conveyed towards said related destination location; and sorting said article to said related destination location.

33. The method of claim 32, further comprising the step of transmitting a perceptible signal from said related destination location when said article approaches said destination location.

34. The method of claim 33, wherein the step of transmitting said perceptible signal comprises illuminating one or more illumination strips positioned around a perimeter of said destination location.

35. A method of designating and sorting an article, comprising the steps of:

conveying said article toward a plurality of destination locations;

determining a related destination location for said article;

displaying one or more characters on a display device positioned proximate a path followed by said article as said article is conveyed towards said related destination location, said one or more characters programmed to relate said article to said destination location;

moving said one or more characters across said display device in a manner programmed to correspond to the movement of said article along said path followed by said article as said article is conveyed towards said related destination location; and sorting said article to said related destination location.

* * * * *